US010649277B1

(12) United States Patent
Sugiyama

(10) Patent No.: US 10,649,277 B1
(45) Date of Patent: May 12, 2020

(54) PANEL UNIT AND DISPLAY DEVICE

(71) Applicant: SHARP KABUSHIKI KAISHA, Sakai, Osaka (JP)

(72) Inventor: Ryohsuke Sugiyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/446,975

(22) Filed: Jun. 20, 2019

(51) Int. Cl.
*F21V 7/04* (2006.01)
*G02F 1/13357* (2006.01)
*G02F 1/1333* (2006.01)

(52) U.S. Cl.
CPC .. *G02F 1/133608* (2013.01); *G02F 1/133308* (2013.01)

(58) Field of Classification Search
CPC ...................................... G02F 1/1333–133615
USPC ............................... 362/632–634; 349/58–60
See application file for complete search history.

(56) References Cited

FOREIGN PATENT DOCUMENTS

JP 2009-026713 A 2/2009

*Primary Examiner* — Jason M Han
(74) *Attorney, Agent, or Firm* — ScienBiziP, P.C.

(57) ABSTRACT

A panel unit includes: a bezel including a frame-shaped section that surrounds an opening like a frame; a panel opposing the frame-shaped section; and a first double-sided tape and a second double-sided tape that are disposed adjacent to each other between the frame-shaped section and the panel to fixedly attach the frame-shaped section and the panel together, wherein the first double-sided tape has a first opposing face opposing the second double-sided tape, and the second double-sided tape has a second opposing face opposing the first opposing face, each of the first and second opposing faces having at least one convexo-concave portion. This structure provides a panel unit including a double-sided tape that provides a surrounding frame shape that is adjustable in size in accordance with a panel size.

11 Claims, 6 Drawing Sheets

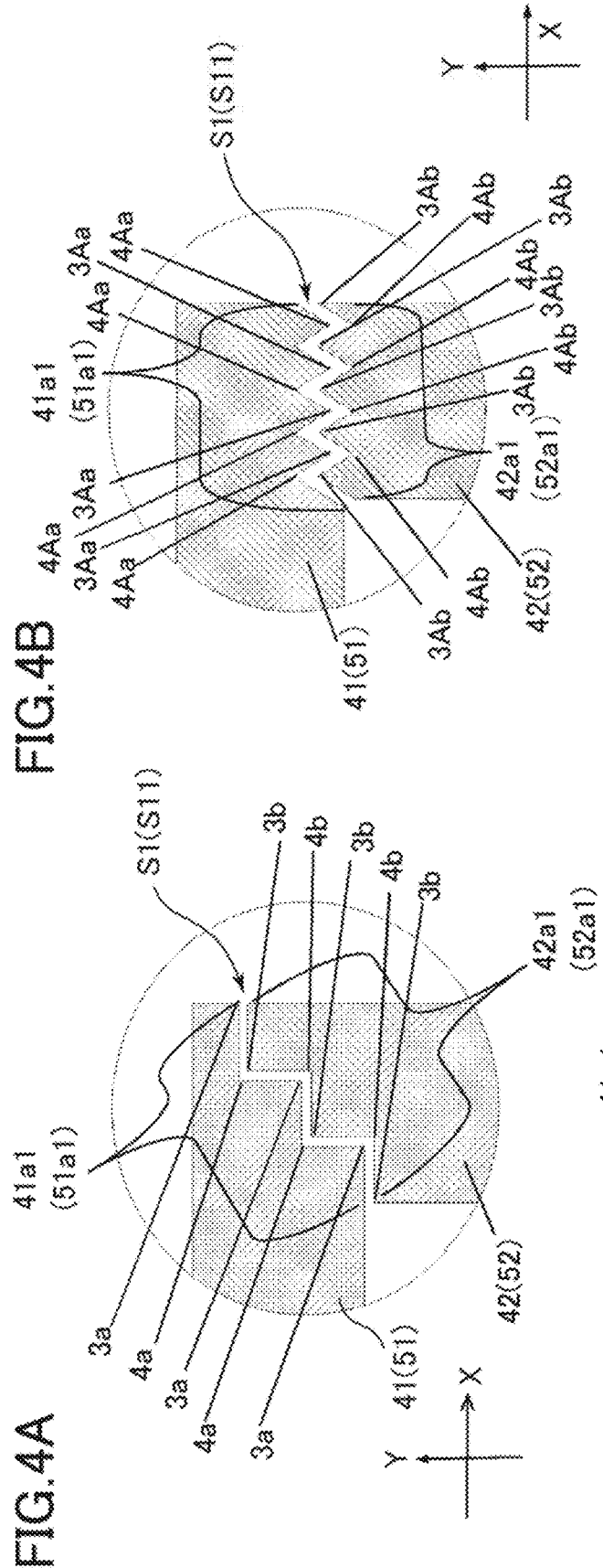
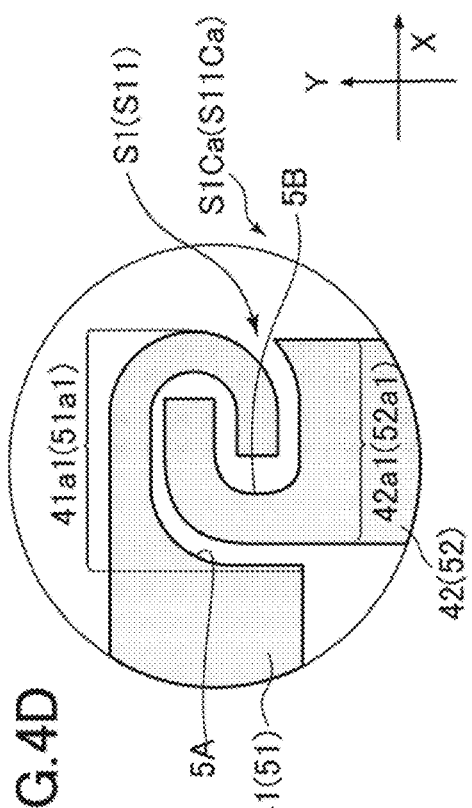
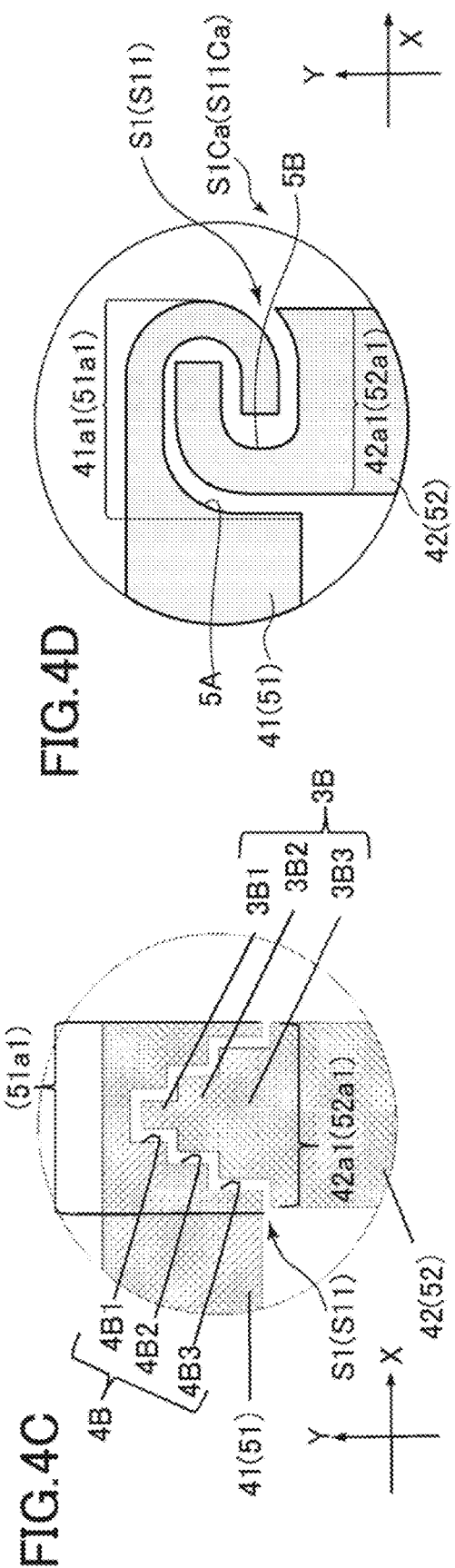
FIG.4A  FIG.4B  FIG.4C  FIG.4D

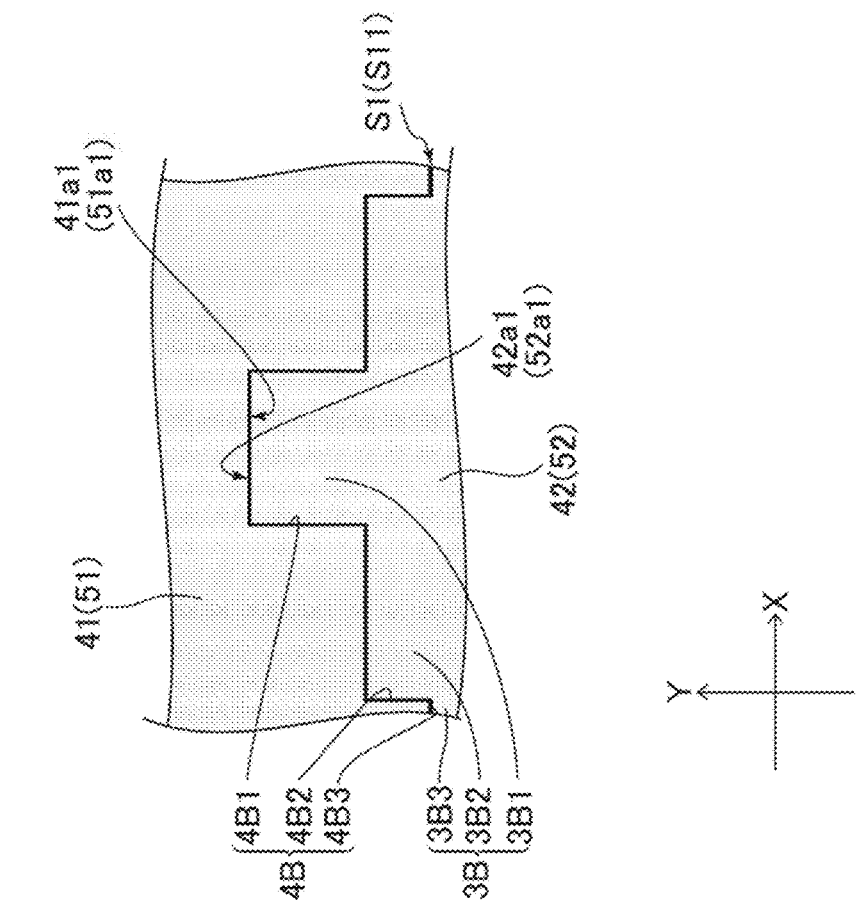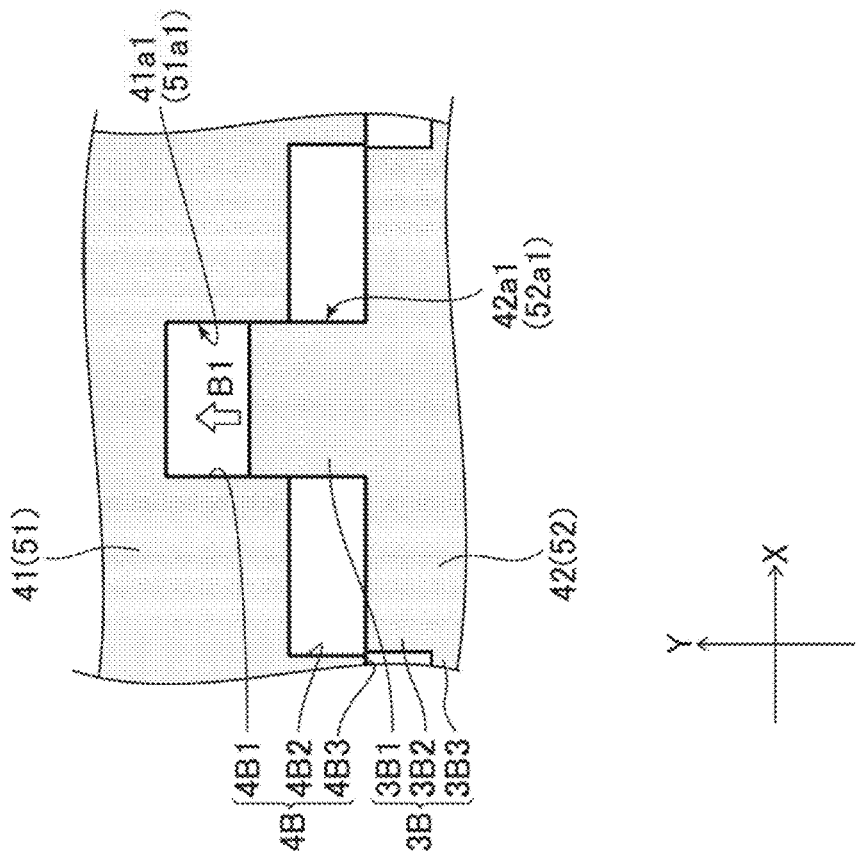

PANEL UNIT AND DISPLAY DEVICE

FIELD OF THE INVENTION

The present invention, in an aspect thereof, relates to panel units and display devices.

BACKGROUND OF THE INVENTION

Patent Literature 1 discloses a frame-shaped fixing tape for fixing a liquid crystal display panel to a backlight frame that houses a backlight. The backlight frame is attached to one of the two surfaces of the fixing tape, and the liquid crystal display panel is attached to the other surface of the fixing tape, to fix the backlight frame and the liquid crystal display panel. There is provided a conductive path along a side of the frame-shaped fixing tape. The conductive path does not extend along a straight line, but zigzags or bends with curves. This structure, according to Patent Literature 1, can prevent foreign objects from entering the inside of the fixing-tape frame through the conductive path.

CITATION LIST

Patent Literature

Patent Literature 1: Japanese Unexamined Patent Application Publication, Tokukai, No. 2009-26713

SUMMARY OF THE INVENTION

Problems to be Solved by the Invention

The frame-shaped fixing tape described in Patent Literature 1 is prepared integrally as a single, frame-shaped piece. The fixing tape is therefore not applicable to liquid crystal display panels of various sizes. The present invention, in an aspect thereof, has an object to provide a panel unit and a display device each including a double-sided tape that provides a surrounding frame shape that is adjustable in size in accordance with a panel size.

Solution to the Problems

The present invention, in an aspect thereof, is directed to a panel unit including: a bezel including a frame-shaped section that surrounds an opening like a frame; a panel opposing the frame-shaped section; and a first double-sided tape and a second double-sided tape that are disposed adjacent to each other between the frame-shaped section and the panel to fixedly attach the frame-shaped section and the panel together, wherein the first double-sided tape has a first opposing face opposing the second double-sided tape, and the second double-sided tape has a second opposing face opposing the first opposing face, each of the first and second opposing faces having at least one convexo-concave portion.

The present invention, in an aspect thereof, is directed to a display device including: a first bezel including a first frame-shaped section that surrounds an opening like a frame, the first bezel being a part of a backlight module; a display panel opposing the first frame-shaped section; a first double-sided tape and a second double-sided tape that are disposed adjacent to each other between the first frame-shaped section and the display panel to fixedly attach the first frame-shaped section and the display panel together, a second bezel including a second frame-shaped section that surrounds like a frame an opening opposing the display panel; a touch panel opposing the second frame-shaped section; and a fifth double-sided tape and a sixth double-sided tape that are disposed adjacent to each other between the second frame-shaped section and the touch panel to fixedly attach the second frame-shaped section and the touch panel together, wherein: the first double-sided tape has a first opposing face opposing the second double-sided tape, and the second double-sided tape has a second opposing face opposing the first opposing face, each of the first and second opposing faces having at least one convexo-concave portion; and the fifth double-sided tape has a fifth opposing face opposing the sixth double-sided tape, and the sixth double-sided tape has a sixth opposing face opposing the fifth opposing face, each of the fifth and sixth opposing faces having at least one convexo-concave portion.

Advantageous Effects of the Invention

The present invention, in an aspect thereof, provides a panel unit including a double-sided tape that provides a surrounding frame shape that is adjustable in size in accordance with a panel size.

BRIEF DESCRIPTION OF DRAWINGS

FIG. 4A is a plan view of a first example of convexo-concave portions of adjacent double-sided tapes shown in FIG. 3.

FIG. 4B is a plan view of a second example of convexo-concave portions of adjacent double-sided tapes shown in FIG. 3.

FIG. 4C is a plan view of a third example of convexo-concave portions of adjacent double-sided tapes shown in FIG. 3.

FIG. 4D is a plan view of a fourth example of convexo-concave portions of adjacent double-sided tapes shown in FIG. 3.

FIG. 6A is an illustration of the convexity shown in FIG. 4C being inserted into a concavity.

FIG. 6B is an illustration of the convexity shown in FIG. 6A having been inserted into the concavity.

DESCRIPTION OF EMBODIMENTS

Figure 1:
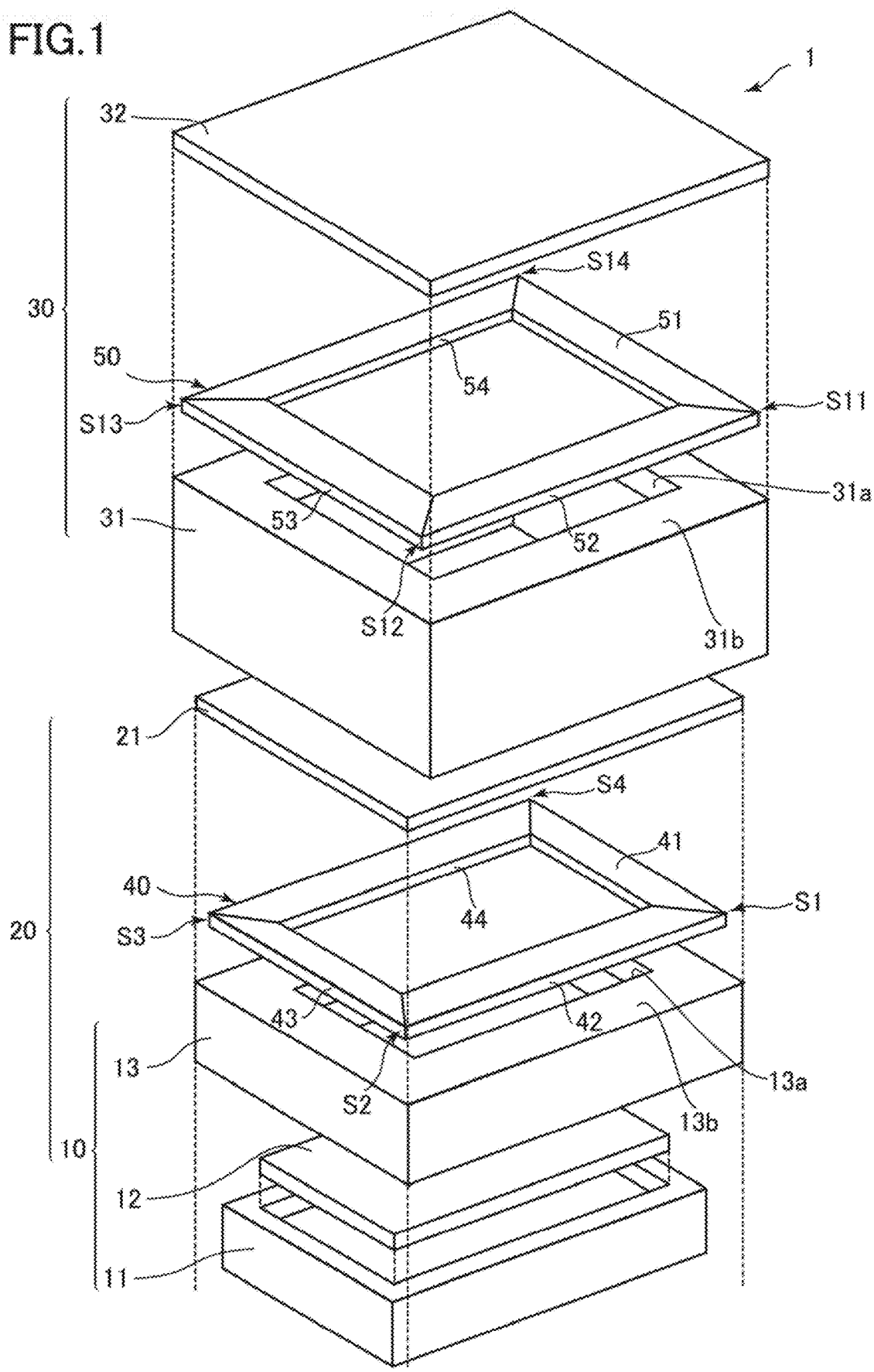
FIG. 1 is a perspective exploded view of an example display device in accordance with an embodiment.
Figure 2:
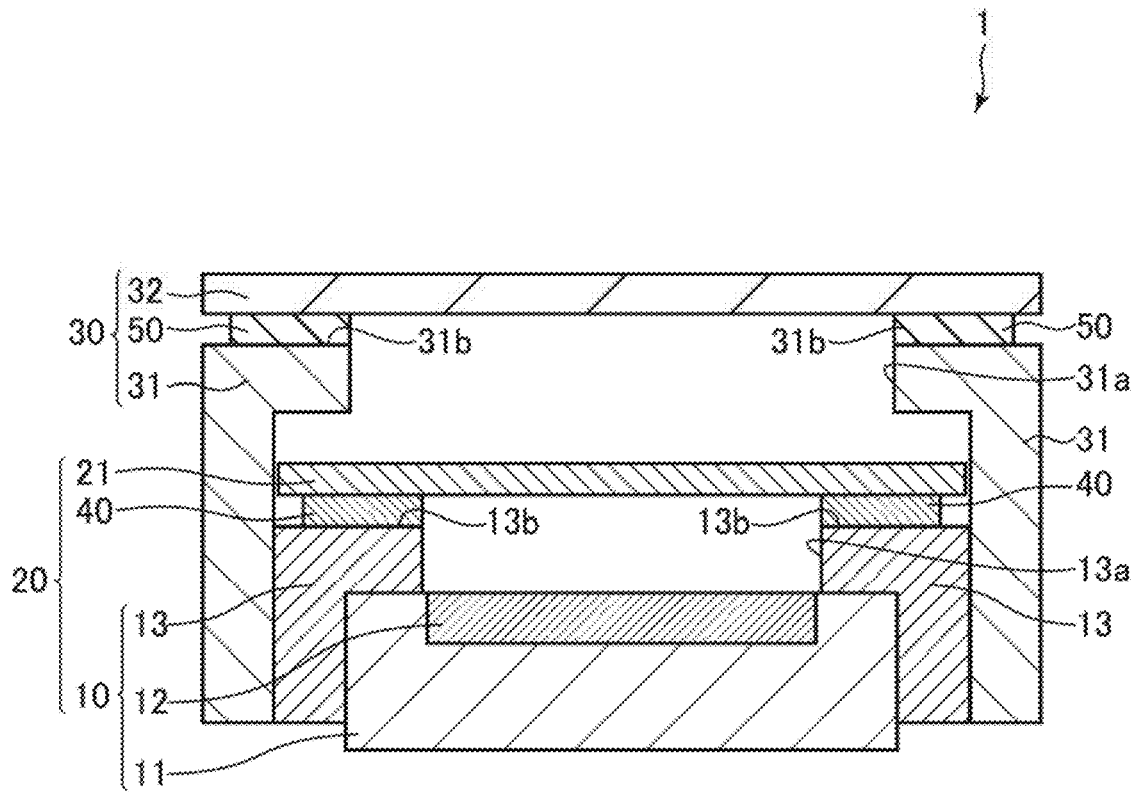
FIG. 2 is a cross-sectional view of an example structure of the display device in accordance with the embodiment.

The following will describe embodiments of the present invention with reference to drawings. The same or equivalent elements are denoted by the same reference numerals throughout the drawings, and description of such elements is not repeated. FIG. 1 is a perspective exploded view of an example display device 1 in accordance with an embodiment. FIG. 2 is a cross-sectional view of an example structure of the display device 1 in accordance with the embodiment. Referring to FIGS. 1 and 2, the display device 1 includes, for example, a display panel unit (panel unit) 20 and a touch panel unit (panel unit) 30. The display panel unit 20 includes a backlight unit 10, a display panel (panel) 21, and a set of double-sided tapes 40. The backlight unit 10 includes a first backlight bezel (bezel) 11, a second backlight bezel (bezel, first bezel) 13, and a backlight 12 that in turn includes at least one light source. The touch panel unit 30 includes a touch panel (panel) 32, a set of double-sided tapes 50, and a touch panel bezel (bezel, second bezel) 31.

The backlight 12 is disposed so as to have a light-exiting side thereof oppose the backside of the display panel 21 (a face of the display panel 21 that is opposite from the touch panel 32). The backlight 12 is a lighting unit that provides an area light source for the display panel 21. The backlight 12 is housed in the first backlight bezel 11 and includes at least a light source unit that in turn includes at least one light source such as an LED (light-emitting diode). The at least one light source may be disposed immediately below the display panel 21 or in combination with a platelike light guide plate. The backlight 12 may further include: a reflective sheet that, disposed on an internal bottom face of the first backlight bezel 11, reflects the light emitted by the at least one light source in the direction of the display panel; and a diffusion sheet disposed opposing the display panel 21. If the backlight 12 includes a light guide plate, the reflective sheet and the diffusion sheet are arranged so as to sandwich the light guide plate so that the backlight 12 can efficiently guide the light emitted by the at least one light source to the display panel 21.

The first backlight bezel 11 and the second backlight bezel 13 make a pair of backlight bezels that provides a casing enclosing the backlight 12. The second backlight bezel 13 supports the display panel 21. The first backlight bezel 11 supports the backlight 12 on the backside of the backlight 12. The first backlight bezel 11 has formed in the front face thereof (on the side opposing the backlight 12) a recess with a sufficient area to contain the backlight 12. The first backlight bezel 11 covers the back and side faces of the backlight 12 when the backlight 12 is placed inside the recess.

The second backlight bezel 13 is a frame-shaped casing surrounding an opening 13*a*. The first backlight bezel 11 is placed inside the second backlight bezel 13 from the backside of the second backlight bezel 13. In other words, the second backlight bezel 13 is positioned outside the first backlight bezel 11. The second backlight bezel 13 is thus attached to the first backlight bezel 11. The second backlight bezel 13 hence covers the side and front faces of the first backlight bezel 11. The second backlight bezel 13 includes a frame-shaped section 13*b* that is a face (front face) opposing the display panel 21. The frame-shaped section 13*b* surrounds the opening 13*a* like a frame to support a frame area of the display panel 21 via the set of double-sided tapes 40. The opening 13*a* overlaps the exit face of the backlight 12. In other words, in a plan view (when viewed normal to the exit face of the backlight 12), the frame-shaped section 13*b* surrounds the exit face of the backlight 12. The opening 13*a* therefore transmits the two-dimensional radiation of light that comes from the exit face of the backlight 12.

The display panel 21 is a panel for displaying an image thereon. The display panel 21 as a whole is positioned opposing the opening 13*a* and the frame-shaped section 13*b* with the set of double-sided tapes 40 being interposed therebetween. The frame area of the display panel 21 is positioned opposing the frame-shaped section 13*b* with the set of double-sided tapes 40 being interposed therebetween. The frame area of the display panel 21 surrounds a display area where an image is displayed. The image display area of the display panel 21 is positioned opposing the opening 13*a*. This particular structure enables the light emitted by the backlight 12 to pass through the opening 13*a* and illuminate the display area of the display panel 21. The display panel 21 is, for example, a liquid crystal display panel. The display panel 21 may be any panel other than a liquid crystal display panel so long as the display panel 21 can display an image. When the display panel 21 is, as an example, a self light-emitting panel such as an organic LED display panel, the display device 1 may not include the backlight 12 and the first backlight bezel 11.

The set of double-sided tapes 40 is disposed on the front face of the frame-shaped section 13*b* and includes a plurality of double-sided tapes. For instance, the set of double-sided tapes 40 includes a double-sided tape (first double-sided tape) 41, a double-sided tape (second double-sided tape) 42, a double-sided tape (third double-sided tape) 43, and a double-sided tape (fourth double-sided tape) 44 that are arranged sequentially adjacent to each other. The set of double-sided tapes 40 is interposed between the frame-shaped section 13*b* and the display panel 21. Each double-sided tape 40 is adhesive on both the front and back sides thereof. The front side of the double-sided tape 40 is attached to the frame area on the backside of the display panel 21, and the backside of the double-sided tape 40 is attached to the front face of the frame-shaped section 13*b*. The set of double-sided tapes 40 thereby fixes the display panel 21 to the frame-shaped section 13*b*. The set of double-sided tapes 40 will be described later in more detail.

The touch panel bezel 31 supports the touch panel 32 on the backside of the touch panel 32. The touch panel bezel 31 is a frame-shaped casing surrounding an opening 31*a*. The display panel unit 20 is placed inside the touch panel bezel 31 from the backside of the touch panel bezel 31. In other words, the touch panel bezel 31 is placed around the second backlight bezel 13. This particular structure enables attaching the touch panel bezel 31 to the second backlight bezel 13 of the display panel unit 20. The touch panel bezel 31 hence covers the side faces of the second backlight bezel 13 and the frame area on the front face of the display panel 21 (on the side opposing the touch panel 32). The touch panel bezel 31 includes a frame-shaped section 31*b* that is a face (front face) opposing the touch panel 32. The frame-shaped section 31*b* surrounds the opening 31*a* like a frame to support a frame area of the touch panel 32 via the set of double-sided tapes 50. The opening 31*a* overlaps the image display area of the display panel 21 and has an area that is equal to or larger than the image display area. In other words, when viewed normal to the display panel 21, the frame-shaped section 31*b* surrounds the image display area of the display panel 21.

The touch panel 32 is, for example, a panel for receiving an input of a location on the front face of the touch panel 32 (the surface of the touch panel 32 opposite from the touch panel 32) by the user touching the front face of the touch panel 32 with a pointing member such as his/her finger or a pen. The touch panel 32 may receive such an input by one of various techniques including capacitive methods.

The touch panel 32 as a whole is positioned opposing the opening 31*a* and the frame-shaped section 31*b* with the set of double-sided tapes 50 being interposed therebetween. The peripheral edge of the touch panel 32 is positioned opposing the frame-shaped section 31*b* with the set of double-sided tapes 50 being interposed therebetween. The part of the touch panel 32 that opposes the frame-shaped section 31*b* is called the frame area. The internal area surrounded by this frame area of the touch panel 32 is positioned opposing the opening 31*a*. This particular structure allows the user to view the image displayed in the image display area of the display panel 21 through the opening 31a and the touch panel 32. The touch panel 32 and the display panel 21 may, for example, be integrated into a single body. When this is actually the case, the display device 1 may not include the set of double-sided tapes 50 and the touch panel bezel 31.

The set of double-sided tapes 50 is disposed on the front face of the frame-shaped section 31b and includes a plurality of double-sided tapes. For instance, the set of double-sided tapes 50 includes a double-sided tape (fifth double-sided tape) 51, a double-sided tape (sixth double-sided tape) 52, a double-sided tape (seventh double-sided tape) 53, and a double-sided tape (eighth double-sided tape) 54 that are arranged sequentially adjacent to each other. The set of double-sided tapes 50 is interposed between the frame-shaped section 31b and the touch panel 32. Each double-sided tape 50 is adhesive on both the front and back sides thereof. The front side of the double-sided tape 50 is attached to the frame area on the backside of the touch panel 32, and the backside of the double-sided tape 50 is attached to the front face of the frame-shaped section 31b. The set of double-sided tapes 50 thereby fixes the touch panel 32 to the frame-shaped section 31b. For instance, since the set of double-sided tapes 50 is disposed like a frame on the frame-shaped section 31b which is larger in size than the frame-shaped section 13b of the second backlight bezel 13, the set of double-sided tapes 50 forms a surrounding frame that is larger in size than does the set of double-sided tapes 40 disposed like a frame on the frame-shaped section 13b of the second backlight bezel 13.

Figure 3:
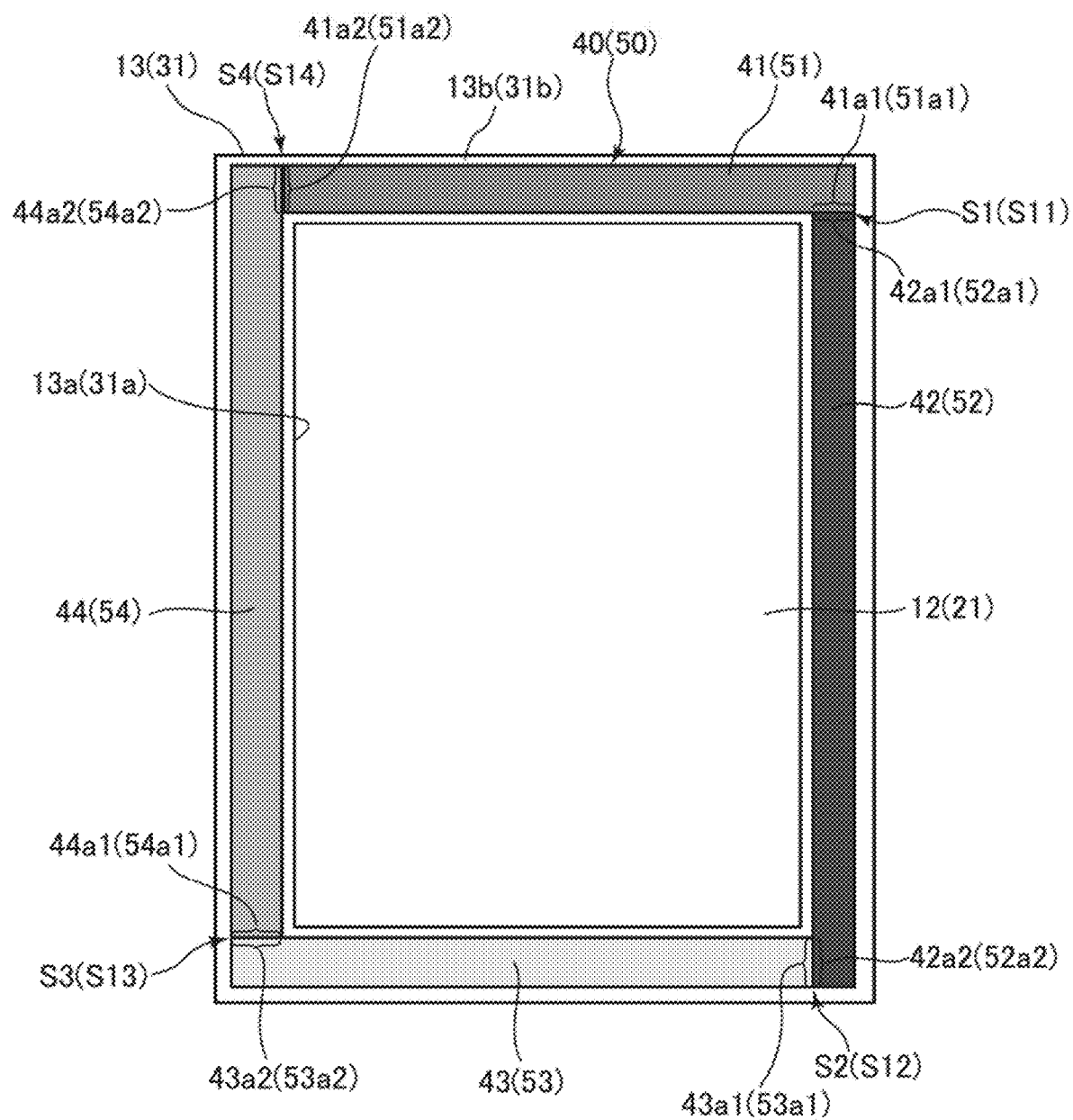
FIG. 3 is a plan view of an example structure of a set of double-sided tapes in the display device shown in FIG. 1.
Figure 3:
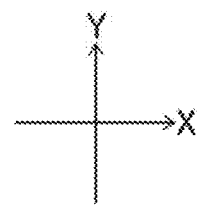

A detailed description will be given next of an example structure of the sets of double-sided tapes 40 and 50 with reference to FIGS. 1 and 3. FIG. 3 is a plan view of an example structure of the set of double-sided tapes 40 in the display device 1. FIG. 3 represents an example structure of the set of double-sided tapes 50 using parentheses. The sets of double-sided tapes 40 and 50, in the display device 1, may have either the same structure or different structures. The present embodiment assumes that the sets of double-sided tapes 40 and 50 have the same structure except that they are of different sizes.

Referring to FIGS. 1 and 3, for example, the double-sided tapes 41 to 44 of the set of double-sided tapes 40 surround the opening 13a like a frame. One of the two ends of the double-sided tape 41 has a face opposing one of the two ends of the double-sided tape 42, and the face is referred to as an opposing face (first opposing face) 41a1. One of the two ends of the double-sided tape 42 has a face opposing one of the two ends of the double-sided tape 41, and the face is referred to as an opposing face (second opposing face) 42a1, whilst the other end of the double-sided tape 42 has a face opposing one of the two ends of the double-sided tape 43, and the face is referred to as an opposing face (first opposing face) 42a2. One of the two ends of the double-sided tape 43 has a face opposing the other end of the double-sided tape 42, and the face is referred to as an opposing face (second opposing face) 43a1, whilst the other end of the double-sided tape 43 has a face opposing one of the two ends of the double-sided tape 44, and the face is referred to as an opposing face (first opposing face) 43a2. One of the two ends of the double-sided tape 44 has a face opposing the other end of the double-sided tape 43, and the face is referred to as an opposing face (second opposing face) 44a1, whilst the other end of the double-sided tape 44 has a face opposing the other end of the double-sided tape 41, and the face is referred to as an opposing face (second opposing face) 44a2. The other end of the double-sided tape 41 has a face opposing the other end of the double-sided tape 44, and the face is referred to as an opposing face (first opposing face) 41a2.

The double-sided tapes 51 to 54 of the set of double-sided tapes 50 surround the opening 31a like a frame. One of the two ends of the double-sided tape 51 has a face opposing one of the two ends of the double-sided tape 52, and the face is referred to as an opposing face (first opposing face, fifth opposing face) 51a1. One of the two ends of the double-sided tape 52 has a face opposing one of the two ends of the double-sided tape 51, and the face is referred to as an opposing face (second opposing face, sixth opposing face) 52a1, whilst the other end of the double-sided tape 52 has a face opposing one of the two ends of the double-sided tape 53, and the face is referred to as an opposing face (first opposing face, fifth opposing face) 52a2. One of the two ends of the double-sided tape 53 has a face opposing the other end of the double-sided tape 52, and the face is referred to as an opposing face (second opposing face, sixth opposing face) 53a1, whilst the other end of the double-sided tape 53 has a face opposing one of the two ends of the double-sided tape 54, and the face is referred to as an opposing face (first opposing face, fifth opposing face) 53a2. One of the two ends of the double-sided tape 54 has a face opposing the other end of the double-sided tape 53, and the face is referred to as an opposing face (second opposing face, sixth opposing face) 54a1, whilst the other end of the double-sided tape 54 has a face opposing the other end of the double-sided tape 51, and the face is referred to as an opposing face (second opposing face, sixth opposing face) 54a2. The other end of the double-sided tape 51 has a face opposing the other end of the double-sided tape 54, and the face is referred to as an opposing face (first opposing face, fifth opposing face) 51a2.

There is provided a slit S1 between the opposing face 41a1 of the double-sided tape 41 and the opposing face 42a1 of the double-sided tape 42. There is provided a slit S2 between the opposing face 42a2 of the double-sided tape 42 and the opposing face 43a1 of the double-sided tape 43. There is provided a slit S3 between the opposing face 43a2 of the double-sided tape 43 and the opposing face 44a1 of the double-sided tape 44. There is provided a slit S4 between the opposing face 44a2 of the double-sided tape 44 and the opposing face 41a2 of the double-sided tape 41. There is provided a slit S11 between the opposing face 51a1 of the double-sided tape 51 and the opposing face 52a1 of the double-sided tape 52. There is provided a slit S12 between the opposing face 52a2 of the double-sided tape 52 and the opposing face 53a1 of the double-sided tape 53. There is provided a slit S13 between the opposing face 53a2 of the double-sided tape 53 and the opposing face 54a1 of the double-sided tape 54. There is provided a slit S14 between the opposing face 54a2 of the double-sided tape 54 and the opposing face 51a2 of the double-sided tape 51.

The set of double-sided tapes 40 has a rectangular periphery in the present embodiment. The slits S1 to S4 are located at the four respective corners of this rectangle. The set of double-sided tapes 40, in a plan view, does not necessarily have a rectangular shape and may have a shape that can be varied depending on the planar shape of the display panel 21. The set of double-sided tapes 40 needs only to include a plurality of double-sided tapes, have an overall frame-like shape, and provide at least two slits (in other words, include at least two double-sided tapes). The set of double-sided tapes 50 is rectangular in the present embodiment. The slits S11 to S14 are located at the four respective corners of this rectangle. The set of double-sided tapes 50, in a plan view, does not necessarily have a rectangular shape and may have a shape that can be varied depending on the planar shape of the touch panel 32. The set of double-sided tapes 50 needs only to include a plurality of double-sided tapes, have an overall frame-like shape, and provide at least two slits (in other words, include at least two double-sided tapes).

The present embodiment defines perpendicular X- and Y-directions and assumes that the double-sided tapes 41 and 43 are perpendicular and adjacent to the double-sided tapes 42 and 44 respectively and also that the double-sided tapes 51 and 53 are perpendicular and adjacent to the double-sided tapes 52 and 54 respectively. Alternatively, the double-sided tapes 41 and 43 may adjoin the double-sided tapes 42 and 44 at an angle other than 90°, and the double-sided tapes 51 and 53 may adjoin the double-sided tapes 52 and 54 at an angle other than 90°.

The present embodiment assumes that the double-sided tapes 41, 43, 51, and 53 extend in X-direction (i.e., the lengthwise direction of the double-sided tapes 41, 43, 51, and 53) and have a width in Y-direction (i.e., the widthwise direction perpendicular to the lengthwise direction of the double-sided tapes 41, 43, 51, and 53). The present embodiment also assumes that the double-sided tapes 42, 44, 52, and 54 extend in Y-direction (i.e., the lengthwise direction of the double-sided tapes 42, 44, 52, and 54) and have a width in X-direction (i.e., the widthwise direction perpendicular to the lengthwise direction of the double-sided tapes 42, 44, 52, and 54).

The double-sided tapes 41 to 44 (double-sided tapes 51 to 54) are attached to the frame-shaped section 13b (frame-shaped section 31b) by, for example, a robot or human worker. The double-sided tapes 41 to 44 (double-sided tapes 51 to 54) may be attached to the frame-shaped section 13b (frame-shaped section 31b) in any order. As an example, of the double-sided tapes 41 to 44 (double-sided tapes 51 to 54), the double-sided tape 41 (double-sided tape 51) is first attached to the frame-shaped section 13b (frame-shaped section 31b) along X-direction. Then, the double-sided tape 42 (double-sided tape 52) is attached to the frame-shaped section 13b (frame-shaped section 31b) along Y-direction so as to have the opposing face 42a1 (opposing face 52a1) positioned opposing the opposing face 41a1 (opposing face 51a1) of the double-sided tape 41 (double-sided tape 51). Next, the double-sided tape 43 (double-sided tape 53) is attached to the frame-shaped section 13b (frame-shaped section 31b) along X-direction so as to have the opposing face 43a1 (opposing face 53a1) positioned opposing the opposing face 42a2 (opposing face 52a2) of the double-sided tape 42 (double-sided tape 52). Next, the double-sided tape 44 (double-sided tape 54) is attached to the frame-shaped section 13b (frame-shaped section 31b) along Y-direction so as to have the opposing face 44a1 (opposing face 54a1) positioned opposing the opposing face 43a2 (opposing face 53a2) of the double-sided tape 43 (double-sided tape 53), and to have the opposing face 44a2 (opposing face 54a2) positioned opposing the opposing face 41a2 (opposing face 51a2) of the double-sided tape 41 (double-sided tape 51). The double-sided tapes 41 to 44 (double-sided tapes 51 to 54) may be attached to the frame-shaped section 13b (frame-shaped section 31b) in this manner. Alternatively, the double-sided tapes 41 to 44 (double-sided tapes 51 to 54) may be attached to the frame-shaped section 13b (frame-shaped section 31b) in an order other than that specifically described here.

The double-sided tapes 41 to 44 and 51 to 54 may be each prepared in a desired shape, for example, by stamping or otherwise cutting them out of one or more large-sized sheets of double-sided tape base material. The double-sided tapes 41 to 44 and 51 to 54 may be each prepared with any thickness. Each double-sided tape 41 to 44 and 51 to 54 may have a thickness of, for example, from 2 mm to 4 mm, inclusive.

The double-sided tapes 41 to 44 and 51 to 54 may each have any width that is appropriately determined in view of the intended use of the display device 1. For instance, each double-sided tape 41 to 44 may have a smaller width than the frame-shaped section 13b, the same width as the frame-shaped section 13b, or a larger width than the frame-shaped section 13b. The double-sided tapes 41 to 44 may have such a size as to expand beyond the peripheral edge of the display panel 21 in a plan view. Each double-sided tape 51 to 54 may have a smaller width than the frame-shaped section 31b, the same width as the frame-shaped section 31b, or a larger width than the frame-shaped section 31b. The double-sided tapes 51 to 54 may have such a size as to expand beyond the peripheral edge of the touch panel 32 in a plan view.

The set of double-sided tapes 40 in the display device 1 is constituted by a plurality of double-sided tapes and as a whole is shaped like a frame as described above. Therefore, unlike the single-piece fixing tape of Patent Literature 1 which is prepared integrally as a single, frame-shaped piece, the set of double-sided tapes 40 allows adjustment of the length of each of the double-sided tapes in accordance with the size (i.e., the length of a side) of the display panel 21, thereby allowing adjustment of the size of the frame shape that the set of double-sided tapes 40 provides. Hence, the display device 1 can be constructed that includes the set of double-sided tapes 40 which enables adjusting the size of the surrounding frame shape in accordance with the size of the display panel 21.

The set of double-sided tapes 50 in the display device 1 is similarly constituted by a plurality of double-sided tapes and as a whole is shaped like a frame. Therefore, unlike the single-piece fixing tape of Patent Literature 1 which is prepared integrally as a single, frame-shaped piece, the set of double-sided tapes 50 allows adjustment of the length of each of the double-sided tapes in accordance with the size (i.e., the length of a side) of the touch panel 32, thereby allowing adjustment of the size of the frame shape that the set of double-sided tapes 50 provides. Hence, the display device 1 can be constructed that includes the set of double-sided tapes 50 which enables adjusting the size of the surrounding frame shape in accordance with the size of the touch panel 32.

Only either one of the set of double-sided tapes 40 and the set of double-sided tapes 50 may be constituted by a plurality of double-sided tapes and as a whole be shaped like a frame, and the other set may be constituted by a single double-sided tape prepared integrally as a single, frame-shaped piece (i.e., a frame-shaped double-sided tape that has no slits).

Each opposing face of at least one of the pairs of opposing faces opposing each other to form the slits S1 to S4 in the double-sided tapes 41 to 44 shown in FIG. 3 preferably has at least one convexo-concave portion in order to restrict dust, dirt, and other foreign objects from entering the inside of the frame shape surrounded by the set of double-sided tapes 40 from the outside through the associated slit S1 to S4. There may be provided at least one convexo-concave portion on each of the opposing faces 41a1 and 42a1 which form the slit S1. There may be provided at least one convexo-concave portion on each of the opposing faces 42a2 and 43a1 which form the slit S2. There may be provided at least one convexo-concave portion on each of the opposing faces 43a2 and 44a1 which form the slit S3.

There may be provided at least one convexo-concave portion on each of the opposing faces 44a2 and 41a2 which form the slit S4.

Each opposing face of at least one of the pairs of opposing faces opposing each other to form the slits S11 to S14 in the double-sided tapes 51 to 54 preferably has at least one convexo-concave portion in order to restrict dust, dirt, and other foreign objects from entering the inside of the frame shape surrounded by the set of double-sided tapes 50 from the outside through the associated slit S11 to S14. Specifically, there may be provided at least one convexo-concave portion on each of the opposing faces 51a1 and 52a1 which form the slit S11. There may be provided at least one convexo-concave portion on each of the opposing faces 52a2 and 53a1 which form the slit S12. There may be provided at least one convexo-concave portion on each of the opposing faces 53a2 and 54a1 which form the slit S13. There may be provided at least one convexo-concave portion on each of the opposing faces 54a2 and 51a2 which form the slit S14.

Referring to FIGS. 4A to 4D, a description is now given of examples of at least one convexo-concave portion that may be provided on each opposing face of at least one of the pairs of opposing faces opposing each other to form the slits S1 to S4 and S11 to S14. FIG. 4A is a plan view of a first example of convexo-concave portions on opposing faces of adjacent double-sided tapes shown in FIG. 3. FIG. 4B is a plan view of a second example of convexo-concave portions on opposing faces of adjacent double-sided tapes shown in FIG. 3. FIG. 4C is a plan view of a third example of convexo-concave portions on opposing faces of adjacent double-sided tapes shown in FIG. 3. FIG. 4D is a plan view of a fourth example of convexo-concave portions on opposing faces of adjacent double-sided tapes shown in FIG. 3. The convexo-concave shapes shown in FIGS. 4A to 4D are mere examples and may differ from these examples.

FIGS. 4A to 4D show examples where at least one convexo-concave portion is formed on each of the opposing face 41a1 of the double-sided tape 41 and the opposing face 42a1 of the double-sided tape 42. FIGS. 4A to 4D also show, in parentheses, examples where at least one convexo-concave portion is formed on each of the opposing face 51a1 of the double-sided tape 51 and the opposing face 52a1 of the double-sided tape 52.

For instance, as shown in FIG. 4A, the opposing face 41a1 has a plurality of convexo-concave portions (convexities 3a and concavities 4a in this example) formed next to each other like steps thereon, and the opposing face 42a1 has a plurality of convexo-concave portions (convexities 3b and concavities 4b in this example) formed next to each other like steps thereon. The provision of a plurality of convexo-concave portions on the opposing face 41a1 (the provision of the convexities 3a and the concavities 4a in this example) reduces the width of the end portion of the double-sided tape 41 in a stepwise manner toward the tip of the double-sided tape 41 (when traced in the positive X-direction in FIG. 4A) wherein the width is measured in the direction from one of the side faces (the internal side face of the frame shape surrounded by the set of double-sided tapes 40) to the other side face (the external side face of the frame shape surrounded by the set of double-sided tapes 40) (i.e., measured in the positive Y-direction in FIG. 4A). The provision of a plurality of convexo-concave portions on the opposing face 42a1 (the provision of the convexities 3b and the concavities 4b in this example) reduces the width of the end portion of the double-sided tape 42 in a stepwise manner toward the tip of the double-sided tape 42 (when traced in the positive Y-direction in FIG. 4A) wherein the width is measured in the direction from one of the side faces (the internal side face of the frame shape surrounded by the set of double-sided tapes 40) to the other side face (the external side face of the frame shape surrounded by the set of double-sided tapes 40) (in the positive X-direction in FIG. 4A). The convexo-concave portions on the opposing face 41a1 (convexities 3a and concavities 4a) and the convexo-concave portions on the opposing face 42a1 (convexities 3b and concavities 4b) are so shaped that these convexo-concave portions can engage each other.

The slit S1 is formed between the convexo-concave portions on the opposing face 41a1 (convexities 3a and concavities 4a) and the convexo-concave portions on the opposing face 42a1 (convexities 3b and concavities 4b). The slit S1 shown in FIG. 4A is an example of the slit S1 shown in FIG. 3. The slit S1 shown in FIG. 4A is bent at least twice (four times in the example shown in FIG. 4A) to assume a shape like steps when traced from the outside to the inside of the frame shape surrounded by the set of double-sided tapes 40. This particular structure makes it difficult for dust, dirt, and other foreign objects coming into the slit S1 from the outside of the frame shape surrounded by the set of double-sided tapes 40 to reach the inside of the frame shape surrounded by the set of double-sided tapes 40. The structure therefore makes it less likely for foreign objects to stick to the exit face of the backlight 12, thereby restraining the image display quality of the display device 1 from falling.

The opposing face 41a1 (i.e., the convexities 3a and the concavities 4a) may be separated from the opposing face 42a1 (i.e., the convexities 3b and the concavities 4b). It is however preferable that these opposing faces 41a1 and 42a1 be at least in partial contact with each other. This particular structure makes it less likely for foreign objects to pass through the slit S1 and reach the inside of the frame shape surrounded by the set of double-sided tapes 40, thereby better preventing foreign objects from sticking to the exit face of the backlight 12. This can in turn further restrain the image display quality of the display device 1 from falling. The structure effectively and advantageously reduces the probability of foreign objects reaching the inside especially when the slit S1 is bent three or more times as shown in FIG. 4A.

The opposing face 51a1 of the double-sided tape 51 may similarly have a plurality of convexo-concave portions formed thereon in the same shape as the convexo-concave portions formed on the opposing face 41a1 (convexities 3a and concavities 4a in this example). Likewise, the opposing face 52a1 of the double-sided tape 52 may have a plurality of convexo-concave portions formed thereon in the same shape as the convexo-concave portions formed on the opposing face 42a1 (convexities 3b and concavities 4b in this example). The slit S11 has the same shape as the slit S1 shown in FIG. 4A and is formed between the convexo-concave portions on the opposing face 51a1 (convexities 3a and concavities 4a) and the convexo-concave portions on the opposing face 52a1 (convexities 3b and concavities 4b). The slit S11 shown in FIG. 4A is an example of the slit S11 shown in FIG. 3. This particular structure makes it difficult for dust, dirt, and other foreign objects coming into the slit S11 from the outside of the frame shape surrounded by the set of double-sided tapes 50 to reach the inside of the frame shape surrounded by the set of double-sided tapes 50. The structure therefore makes it less likely for foreign objects to stick to the display panel 21, thereby restraining the image display quality of the display device 1 from falling.

Alternatively, for example, as shown in FIG. 4B, the opposing face 41a1 may have a plurality of convexo-concave portions (convexities 3Aa and concavities 4Aa) formed next to each other thereon, and the opposing face 42a1 may have a plurality of convexo-concave portions (convexities 3Ab and concavities 4Ab) formed next to each other thereon. The convexo-concave portions on the opposing face 41a1 (convexities 3Aa and concavities 4Aa) are formed next to each other along X-direction on a part of one of the side faces of the double-sided tape 41 (the internal side face of the frame shape surrounded by the set of double-sided tapes 40). The convexo-concave portions on the opposing face 42a1 (convexities 3Ab and concavities 4Ab) are formed next to each other along X-direction on an end of the double-sided tape 42. The convexo-concave portions on the opposing face 41a1 (convexities 3Aa and concavities 4Aa) and the convexo-concave portions on the opposing face 42a1 (convexities 3Ab and concavities 4Ab) are so shaped that these convexo-concave portions can engage each other. Each convexity 3Aa and 3Ab is a triangular projection. Each concavity 4Aa is a triangular depression such that it can engage the concavity 3Ab. Each concavity 4Ab is a triangular depression such that it can engage the convexity 3Aa. The convexities 3Aa and the convexities 3Ab are not necessarily triangular projections and may take various shapes including quadrilateral and other polygonal projections and semicircular and otherwise curved projections. The concavities 4Aa may take various shapes including quadrilateral and other polygonal depressions and semicircular and otherwise curved depressions so long as the concavities 4Aa can engage the convexities 3Ab. The concavities 4Ab may take various shapes including quadrilateral and other polygonal depressions and semicircular and otherwise curved depressions so long as the concavities 4Ab can engage the convexities 3Aa.

The slit S1 is formed between the convexo-concave portions on the opposing face 41a1 (convexities 3Aa and concavities 4Aa) and the convexo-concave portions on the opposing face 42a1 (convexities 3Ab and concavities 4Ab). The slit S1 shown in FIG. 4B is an example of the slit S1 shown in FIG. 3. The slit S1 shown in FIG. 4B is bent alternately (to the left and then to the right) at least twice (eight times in the example shown in FIG. 4B) when traced from the outside to the inside of the frame shape surrounded by the set of double-sided tapes 40. This particular structure makes it less likely for foreign objects to pass through the slit S1 and reach the inside of the frame shape surrounded by the set of double-sided tapes 40 from the outside. The structure effectively and advantageously reduces the probability of foreign objects reaching the inside especially when the slit S1 is bent three or more times as shown in FIG. 4B.

The opposing face 51a1 of the double-sided tape 51 may similarly have a plurality of convexo-concave portions formed thereon in the same shape as the convexo-concave portions formed on the opposing face 41a1 (convexities 3Aa and concavities 4Aa in this example). Likewise, the opposing face 52a1 of the double-sided tape 52 may have a plurality of convexo-concave portions formed thereon in the same shape as the convexo-concave portions formed on the opposing face 42a1 (convexities 3Ab and concavities 4Ab in this example). The slit S11 has the same shape as the slit S shown in FIG. 4B and is formed between the convexo-concave portions on the opposing face 51a1 (convexities 3Aa and concavities 4Aa) and the convexo-concave portions on the opposing face 52a1 (convexities 3Ab and concavities 4Ab). The slit S11 shown in FIG. 4B is an example of the slit S11 shown in FIG. 3. This particular structure makes it difficult for dust, dirt, and other foreign objects coming into the slit S11 from the outside of the frame shape surrounded by the set of double-sided tapes 50 to reach the inside of the frame shape surrounded by the set of double-sided tapes 50. The structure therefore makes it less likely for foreign objects to stick to the display panel 21, thereby restraining the image display quality of the display device 1 from falling.

Alternatively, for example, as shown in FIG. 4C, the opposing face 41a1 may have a concavity 4B formed therein, and the opposing face 42a1 may have a convexity 3B formed thereon. The concavity 4B in the opposing face 41a1 is formed on a part of one of the side faces of the double-sided tape 41 (the internal side face of the frame shape surrounded by the set of double-sided tapes 40). The concavity 4B in the opposing face 41a1 includes a concavity 4B3, a concavity 4B2, and a concavity 4B 1 that decrease in width (X-direction length of the concavity 4B) in a stepwise manner toward the bottom of the concavity 4B. The convexity 3B on the opposing face 42a1 is formed on an end of the double-sided tape 42. The convexity 3B on the opposing face 42a1 includes a convexity 3B3, a convexity 3B2, and a convexity 3B1 that decrease in width (X-direction length of the convexity 3B) in a stepwise manner toward the tip of the convexity 3B. In other words, the convexity 3B has a shape that increases in width in a stepwise manner from its tip to its bottom. The concavity 4B is a step-shaped depression opened toward the bottom of the concavity 4B so that it can engage the convexity 3B. More specifically, the concavity 4B3 is a depression shaped so as to engage the convexity 3B3, the concavity 4B2 is a depression shaped so as to engage the convexity 3B2, and the concavity 4B 1 is a depression shaped so as to engage the convexity 3B 1.

The slit S1 is formed between the concavity 4B in the opposing face 41a1 and the convexity 3B on the opposing face 42a1. The slit S1 shown in FIG. 4C is an example of the slit S1 shown in FIG. 3. The slit S1 shown in FIG. 4C is bent at least twice (twelve times in the example shown in FIG. 4C) when traced from the outside to the inside of the frame shape surrounded by the set of double-sided tapes 40. This particular structure makes it less likely for foreign objects to pass through the slit S1 and reach the inside of the frame shape surrounded by the set of double-sided tapes 40 from the outside. The structure effectively and advantageously reduces the probability of foreign objects reaching the inside especially when the slit S1 is bent three or more times as shown in FIG. 4C.

The opposing face 51a1 of the double-sided tape 51 may similarly have a concavity 4B formed therein in the same shape as the concavity 4B formed in the opposing face 41a1. Likewise, the opposing face 52a1 of the double-sided tape 52 may have a convexity 3B formed thereon in the same shape as the convexity 3B formed on the opposing face 42a1. The slit S11 has the same shape as the slit S1 shown in FIG. 4C and is formed between the concavity 4B in the opposing face 51a1 and the convexity 3B on the opposing face 52a1. The slit S11 shown in FIG. 4C is an example of the slit S11 shown in FIG. 3. This particular structure makes it difficult for dust, dirt, and other foreign objects coming into the slit S11 from the outside of the frame shape surrounded by the set of double-sided tapes 50 to reach the inside of the frame shape surrounded by the set of double-sided tapes 50. The structure therefore makes it less likely for foreign objects to stick to the display panel 21, thereby restraining the image display quality of the display device 1 from falling.

Alternatively, for example, as shown in FIG. 4D, the opposing face 41a1 may have a convexo-concave portion 5A formed thereon, and the opposing face 42a1 may have a convexo-concave portion 5B formed thereon. The convexo-concave portion 5A on the opposing face 41a1 is formed on a part of one of the side faces of the double-sided tape 41 (the internal side face of the frame shape surrounded by the set of double-sided tapes 40). The convexo-concave portion 5A on the opposing face 41a1 has a generally S-curved shape so as to have a curvature that changes toward the tip of the double-sided tape 41. The convexo-concave portion 5B on the opposing face 42a1 is formed on an end of the double-sided tape 42. The convexo-concave portion 5B on the opposing face 42a1 has a generally S-curved shape with a curvature that changes toward the tip of the double-sided tape 42 so that it can engage the convexo-concave portion 5A.

The slit S1 is formed between the convexo-concave portion 5A on the opposing face 41a1 and the convexo-concave portion 5B on the opposing face 42a1. The slit S1 shown in FIG. 4D is an example of the slit S1 shown in FIG. 3. The slit S1 shown in FIG. 4D is curved when traced from the outside to the inside of the frame shape surrounded by the set of double-sided tapes 40. In the example shown in FIG. 4D, the slit S1 has a generally S-curved shape with a changing curvature. This particular structure makes it less likely for foreign objects to pass through the slit S1 and reach the inside of the frame shape surrounded by the set of double-sided tapes 40 from the outside.

The opposing face 51a1 of the double-sided tape 51 may similarly have a convexo-concave portion 5A formed thereon in the same shape as the convexo-concave portion 5A formed on the opposing face 41a1. Likewise, the opposing face 52a1 of the double-sided tape 52 may have a convexo-concave portion 5B formed thereon in the same shape as the convexo-concave portion 5B formed on the opposing face 42a1. The slit S11 has the same shape as the slit S1 shown in FIG. 4D and is formed between the convexo-concave portion 5A on the opposing face 51a1 and the convexo-concave portion 5B on the opposing face 52a1. The slit S11 shown in FIG. 4D is an example of the slit S11 shown in FIG. 3. This particular structure makes it difficult for dust, dirt, and other foreign objects coming into the slit S11 from the outside of the frame shape surrounded by the set of double-sided tapes 50 to reach the inside of the frame shape surrounded by the set of double-sided tapes 50. The structure therefore makes it less likely for foreign objects to stick to the display panel 21, thereby restraining the image display quality of the display device 1 from falling.

For instance, the opposing faces 41a1 and 42a1 shown in FIGS. 4A to 4D, each having formed thereon at least one convexo-concave portion, may be separated from each other. It is however preferable that these opposing faces 41a1 and 42a1 be at least in partial contact with each other. This particular structure can more reliably make it difficult for foreign objects to pass through the slit S1 shown in FIGS. 4A to 4D and reach the inside of the frame shape surrounded by the set of double-sided tapes 40, thereby better preventing foreign objects from sticking to the exit face of the backlight 12. This can in turn further restrain the image display quality of the display device 1 from falling. In addition, for example, the opposing faces 51a1 and 52a1 shown in FIGS. 4A to 4D, each having formed thereon at least one convexo-concave portion, may be separated from each other. It is however preferable that these opposing faces 51a1 and 52a1 be at least in partial contact with each other. This particular structure can more reliably make it difficult for foreign objects to pass through the slit S11 shown in FIGS. 4A to 4D and reach the inside of the frame shape surrounded by the set of double-sided tapes 50, thereby better preventing foreign objects from sticking to the display panel 21. This can in turn further restrain the image display quality of the display device 1 from falling.

The convexo-concave portions shown in FIG. 4A (convexities 3a, concavities 4a, convexities 3b, and concavities 4b), the convexo-concave portions shown in FIG. 4B (convexities 3Aa, concavities 4Aa, convexities 3Ab, and concavities 4Ab), the concavity 4B and convexity 3B shown in FIG. 4C, and the convexo-concave portions 5A and 5B shown in FIG. 4D or at least one pair of otherwise shaped convexo-concave portions may be formed on at least any one of the pairs of opposing faces of the set of double-sided tapes 40 (e.g., at least one of the pair of opposing faces 41a1 and 42a1, the pair of opposing faces 42a2 and 43a1, the pair of opposing faces 43a2 and 44a1, and the pair of opposing faces 44a2 and 41a2 shown in FIG. 3) and may be formed on at least any one of the pairs of opposing faces of the set of double-sided tapes 50 (e.g., at least one of the pair of opposing faces 51a1 and 52a1, the pair of opposing faces 52a2 and 53a1, the pair of opposing faces 53a2 and 54a1, and the pair of opposing faces 54a2 and 51a2 shown in FIG. 3). The at least one pair of convexo-concave portions on the at least one pair of opposing faces may have any shape that forms either a slit with plural flexures or a curved slit between the pair of opposing faces so long as foreign objects, once having come into the slit, do not easily leave the slit.

For example, either one or both of the set of double-sided tapes 40 and the set of double-sided tapes 50 include(s) a plurality of double-sided tapes as mentioned earlier. Therefore, for example, the double-sided tape 41 is first attached to the frame-shaped section 13b shown in FIG. 3. Subsequently, the double-sided tape 42, which adjoins the double-sided tape 41, is attached to the frame-shaped section 13b with the opposing faces 41a1 and 42a1 of the respective double-sided tapes 41 and 42 being aligned relative to each other. For this purpose, the at least one pair of convexo-concave portions on a pair of opposing faces (e.g., opposing faces 41a1 and 42a1) preferably has a shape that allows easy adjustment of the relative positions of the convexo-concave portions.

Figure 5A:
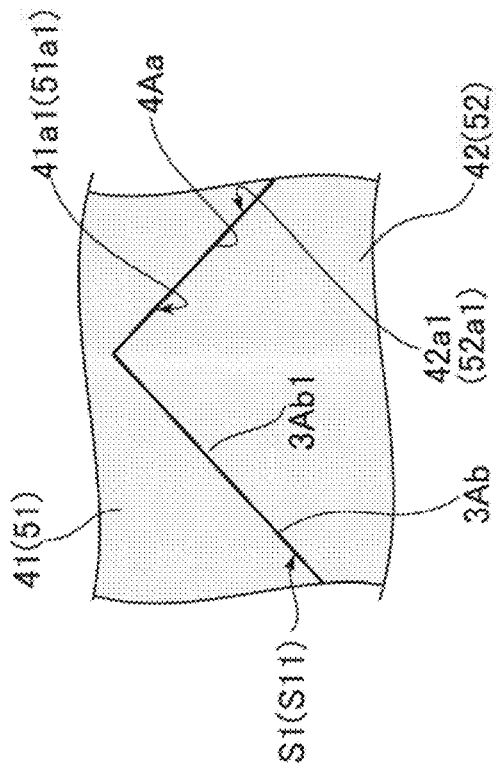
FIG. 5A is an illustration of a convexity shown in FIG. 4B being inserted into a concavity.
Figure 5B:
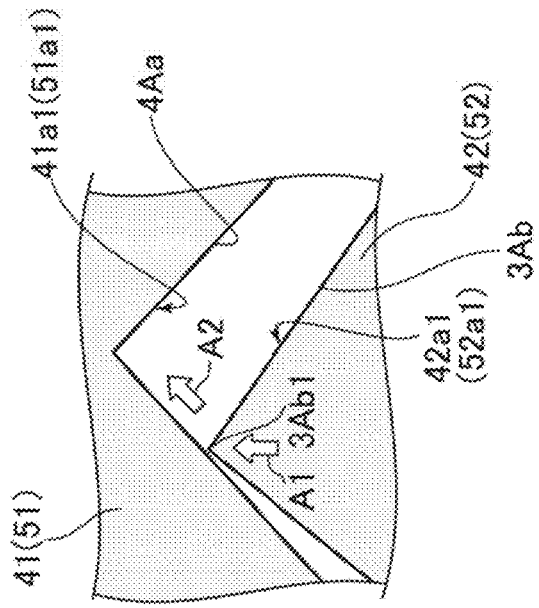
FIG. 5B is an illustration of the convexity shown in FIG. 5A having been inserted into the concavity.

FIG. 5A is an illustration of one of the convexities 3Ab shown in FIG. 4B being inserted into one of the concavities 4Aa. FIG. 5B is an illustration of the convexity 3Ab shown in FIG. 5A having been inserted into the concavity 4Aa. Referring to FIG. 5A, for example, in order to align the opposing face 42a2 of the double-sided tape 42 with the opposing face 41a1 of the double-sided tape 41 which is already attached to the frame-shaped section 13b (see FIG. 3), the convexities 3Ab on the opposing face 42a1 are inserted in Y-direction (i.e., in the direction in which the double-sided tape 42 is extended) into the concavities 4Aa in the opposing face 41a1 as indicated by arrow A1 in FIG. 5A.

Each convexity 3Ab is shaped like a triangle with a width (X-direction length) that increases gradually from a tip 3Ab1 thereof to the bottom. Each concavity 4Aa is shaped like a triangle with a width (X-direction length) that increases gradually from the bottom to the tip. Therefore, when the tip 3Ab1 of the convexity 3Ab touches a tilted face of the concavity 4Aa, the tip 3Ab1 of the convexity 3Ab slides in a guided manner toward the bottom of the concavity 4Aa as indicated by arrow A2. The convexity 3Ab then goes into the concavity 4Aa as shown in FIG. 5B. The convexity 3Ab hence comes into contact with the concavity 4Aa.

As described above with reference to FIGS. 4B, 5A, and 5B, each concavity 4Aa and 4Ab is shaped so as to have such tilted faces that the concavity 4Aa and 4Ab has a width that increases gradually from the bottom to the tip, whilst each convexity 3Aa and 3Ab is shaped so as to have such tilted faces that the convexity 3Aa and 3Ab has a width that increases gradually from the tip to the bottom. The convexo-concave portions (i.e., concavities 4Aa, convexities 3Aa, concavities 4Ab, and convexities 3Ab) may alternatively be described as being so shaped that the convexo-concave portions can slide in a guided manner in aligning the convexo-concave portions. This structure hence helps precise and easy aligning.

The concavities 4Aa are shaped so as to cover the convexities 3Ab in a plan view. The concavities 4Aa thereby interfere with and regulate the X-direction movements of the convexities 3Ab being inserted in Y-direction, enabling the convexities 3Ab to slide in a guided manner. The concavities 4Ab are shaped so as to cover the convexities 3Aa in a plan view. The concavities 4Ab thereby interfere with and regulate the X-direction movements of the convexities 3Aa being inserted in Y-direction, enabling the convexities 3Aa to slide in a guided manner.

In other words, the concavities 4Aa and 4Ab in one of the opposing faces 41a1 and 42a1 are shaped so as to cover the convexities 3Ab and 3Aa on the other one of the opposing faces 41a1 and 42a1. The concavities 4Aa and 4Ab in one of the opposing faces 41a1 and 42a1 may alternatively be described as being shaped so as to interfere with and regulate the movements in X-direction, which crosses Y-direction, of the convexities 3Ab and 3Aa on the other one of the opposing faces 41a1 and 42a1 being inserted in Y-direction. The structure hence helps easy and precise opposite positioning of the opposing face 41a1 and the opposing face 42a1 in such a manner that the convexo-concave portions on the opposing face 41a1 and the opposing face 42a1 can engage properly.

FIG. 6A is an illustration of the convexity 3B shown in FIG. 4C being inserted into the concavity 4B. FIG. 6B is an illustration of the convexity 3B shown in FIG. 6A having been inserted into the concavity 4B. The concavity 4B and the convexity 3B shown in FIGS. 4C, 6A, and 6B also have shapes that help relative positioning. For instance, in order to align the opposing face 42a2 of the double-sided tape 42 with the opposing face 41a1 of the double-sided tape 41 which is already attached to the frame-shaped section 13b (see FIG. 3), the convexity 3B on the opposing face 42a1 is inserted in Y-direction (i.e., in the direction in which the double-sided tape 42 is extended) into the concavity 4B in the opposing face 41a1 as indicated by arrow B 1 in FIG. 6A.

As described earlier, the convexity 3B includes the convexities 3B1, 3B2, and 3B3 which increase in width (X-direction length) in a stepwise manner from the tip to the bottom, and the concavity 4B includes the concavities 4B1, 4B2, and 4B3 which increase in width (X-direction length) in a stepwise manner from the bottom to the tip. Therefore, the convexity 3B1 slides in a guided manner on either one or both side faces of the concavity 4B1, the convexity 3B2 slides in a guided manner on either one or both side faces of the concavity 4B2, and the convexity 3B3 slides in a guided manner on either one or both side faces of the concavity 4B3. The convexity 3B then goes into the concavity 4B as shown in FIG. 6B. The convexity 3B hence comes into contact with the concavity 4B.

As described above with reference to FIGS. 4C, 6A, and 6B, the concavity 4B is shaped so as to have a width that increases in a stepwise manner from its bottom to its tip, and the convexity 3B is shaped so as to have a width that increases in a stepwise manner from its tip to its bottom. The concavity 4B and the convexity 3B may alternatively be described as being so shaped that the concavity 4B and the convexity 3B can slide in a guided manner in aligning the concavity 4B and the convexity 3B. This structure hence helps precise and easy aligning.

The concavity 4B is so shaped so as to cover the convexity 3B in a plan view. The concavity 4B may alternatively be described as being shaped so as to interfere with and regulate the movements in X-direction, which crosses Y-direction, of the convexity 3B being inserted in Y-direction. The concavity 4B thereby interferes with and regulates the relative movements in X-direction of the convexity 3B being inserted in Y-direction, enabling the convexity 3B to slide in a guided manner. The structure hence helps easy and precise opposite positioning of the opposing face 41a1 and the opposing face 42a1 in such a manner that the convexo-concave portions on the opposing face 41a1 and the opposing face 42a1 can engage properly.

The opposing face 41a1, which includes the concavities 4a and the convexities 3a shown in FIG. 4A, may alternatively be described as being shaped so as to cover a side, in terms of X-direction (the side opposing the double-sided tape 41), of the opposing face 42a1, which includes the concavities 4b and the convexities 3b shown in FIG. 4A and to enable sliding that side (the side opposing the double-sided tape 41) of the opposing face 42a1 in a guided manner in aligning the concavities 4a and the convexities 3a with the concavities 4b and the convexities 3b. This structure also helps precise and easy aligning.

Alternatively, for example, there may be provided at least one additional convexity on a part of the concavity 4a and the convexity 3a shown in FIG. 4A and an additional concavity on a part of the convexity 3b and the concavity 4b wherein the additional concavity covers the at least one convexity in a plan view. As a further alternative, there may be provided at least one additional convexity on a part of the concavity 4b and the convexity 3b and an additional concavity on a part of the convexity 3a and the concavity 4a wherein the additional concavity covers the at least one convexity in a plan view. These structures interfere with and regulate the relative movements in X-direction of the concavity 4b and the convexity 3b being positioned to face the concavity 4a and the convexity 3a, thereby enabling guiding the concavity 4b and the convexity 3b. The structures hence help easy and precise opposite positioning of the opposing face 41a1 and the opposing face 42a1 in such a manner that the convexo-concave portions on the opposing face 41a1 and the opposing face 42a1 can engage properly.

The convexo-concave portions shown in FIGS. 4A to 4D, as an example, may be used as alignment marks for members that need to be aligned after the set of double-sided tapes 40 is attached to the frame-shaped section 13b or after the set of double-sided tapes 50 is attached to the frame-shaped section 31b.

The present invention is not limited to the description of the embodiments and examples above. Any structure detailed in the embodiments may be replaced by a practically identical structure, a structure that achieves the same effect and function, or a structure that achieves the same purpose.

The invention claimed is:

1. A panel unit for a display comprising:
   a bezel including a frame-shaped section that surrounds an opening like a frame;
   a panel opposing the frame-shaped section; and
   a first double-sided tape and a second double-sided tape that are disposed adjacent to each other between the frame-shaped section and the panel to fixedly attach the frame-shaped section and the panel together,
   wherein the first double-sided tape has a first opposing face opposing the second double-sided tape, and the second double-sided tape has a second opposing face opposing the first opposing face, each of the first and second opposing faces having at least one convexo-concave portion generally parallel to one another.

2. The panel unit according to claim 1, wherein the at least one convexo-concave portion comprises a plurality of convexo-concave portions.

3. The panel unit according to claim 1, wherein the first opposing face and the second opposing face are at least in partial contact with each other.

4. The panel unit according to claim 1, wherein the at least one convexo-concave portion on the first opposing face and the at least one convexo-concave portion on the second opposing face are shaped so as to engage each other.

5. The panel unit according to claim 1, wherein the at least one convexo-concave portion on the first opposing face is at least partially shaped so as to, when the second double-sided tape is to be disposed adjacent to the first double-sided tape attached to the frame-shaped section, regulate movements of at least a part of the at least one convexo-concave portion on the second opposing face in a direction that crosses a direction in which the second double-sided tape is extended.

6. The panel unit according to claim 5, wherein one of the at least one convexo-concave portion on the first opposing face and the at least one convexo-concave portion on the second opposing face has at least one convexity with a width that increases from a tip thereof to a bottom thereof, and the other one has at least one concavity shaped so as to engage the at least one convexity.

7. The panel unit according to claim 6, wherein the at least one concavity is shaped so as to cover the at least one convexity in a plan view.

8. The panel unit according to claim 7, wherein the at least one convexity is shaped so as to have a width that increases in a stepwise manner from the tip to the bottom.

9. The panel unit according to claim 1, further comprising a third double-sided tape and a fourth double-sided tape that are disposed adjacent to each other between the frame-shaped section and the panel to fixedly attach the frame-shaped section and the panel together, wherein:
   the second double-sided tape and the third double-sided tape oppose each other on respective opposing faces thereof each of which has at least one convexo-concave portion;
   the third double-sided tape and the fourth double-sided tape oppose each other on respective opposing faces thereof each of which has at least one convexo-concave portion; and
   the fourth double-sided tape and the first double-sided tape oppose each other on respective opposing faces thereof each of which has at least one convexo-concave portion.

10. A display device comprising:
    a first bezel including a first frame-shaped section that surrounds an opening like a frame, the first bezel being a part of a backlight module;
    a display panel opposing the first frame-shaped section;
    a first double-sided tape and a second double-sided tape that are disposed adjacent to each other between the first frame-shaped section and the display panel to fixedly attach the first frame-shaped section and the display panel together,
    a second bezel including a second frame-shaped section that surrounds like a frame an opening opposing the display panel;
    a touch panel opposing the second frame-shaped section; and
    a fifth double-sided tape and a sixth double-sided tape that are disposed adjacent to each other between the second frame-shaped section and the touch panel to fixedly attach the second frame-shaped section and the touch panel together, wherein:
    the first double-sided tape has a first opposing face opposing the second double-sided tape, and the second double-sided tape has a second opposing face opposing the first opposing face, each of the first and second opposing faces having at least one convexo-concave portion; and
    the fifth double-sided tape has a fifth opposing face opposing the sixth double-sided tape, and the sixth double-sided tape has a sixth opposing face opposing the fifth opposing face, each of the fifth and sixth opposing faces having at least one convexo-concave portion.

11. The display device according to claim 10, wherein the second bezel is disposed outside the first bezel.

* * * * *